US011835989B1

(12) United States Patent
Shum et al.

(10) Patent No.: US 11,835,989 B1
(45) Date of Patent: Dec. 5, 2023

(54) FPGA SEARCH IN A CLOUD COMPUTE NODE

(71) Applicant: SPLUNK Inc., San Francisco, CA (US)

(72) Inventors: Warren Shum, Mississauga (CA); Zefu Dai, Aurora (CA)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/725,946

(22) Filed: Apr. 21, 2022

(51) Int. Cl.
*G06F 9/38* (2018.01)
*G06F 9/48* (2006.01)
*G06F 9/50* (2006.01)

(52) U.S. Cl.
CPC .......... *G06F 9/3877* (2013.01); *G06F 9/4856* (2013.01); *G06F 9/5066* (2013.01); *G06F 9/5072* (2013.01); *G06F 2209/507* (2013.01); *G06F 2209/508* (2013.01); *G06F 2209/509* (2013.01)

(58) Field of Classification Search
CPC .. G06F 9/3009; G06F 9/3877; G06F 15/7821; G06F 16/90335–90344; G06F 16/2465; G06F 9/5072; G06F 9/5066; G06F 9/4856; G06F 2209/507–509
See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 2005/0240582 | A1* | 10/2005 | Hatonen ............. G06F 16/2465 |
| 2018/0260218 | A1* | 9/2018 | Gopal ....................... G06F 8/47 |
| 2018/0365019 | A1* | 12/2018 | Rossi .................... G06F 9/3877 |
| 2019/0098106 | A1 | 3/2019 | Mungel et al. |
| 2020/0014688 | A1* | 1/2020 | Kohli .................... H04L 9/0891 |
| 2020/0145680 | A1* | 5/2020 | Dikshit ............... H04N 19/176 |
| 2020/0226027 | A1* | 7/2020 | Krasner ............. G06F 11/1423 |
| 2021/0097108 | A1* | 4/2021 | Goyal ............. G06F 16/90335 |
| 2022/0206855 | A1* | 6/2022 | Challapalle ........ G06F 9/30076 |

* cited by examiner

*Primary Examiner* — William B Partridge
(74) *Attorney, Agent, or Firm* — KILPATRICK TOWNSEND & STOCKTON LLP

(57) ABSTRACT

Implementations described herein identify and exploit opportunities for offloading search-time and/or index-time operations to programmed offloading hardware accelerators (POHAs). An event-based data intake and query system is implemented in an enterprise core that is in communication with the POHAs over network interfaces. The system receives search requests associated with search-time operations classified into off-loadable operations and non-off-loadable operations. Non-off-loadable operations are distributed to local processing resources, and off-loadable operations are distributed to the POHAs for offloaded processing. The system can post-process both the locally processed and offload-processed results to generate search results responsive to at least some of the received search requests.

49 Claims, 7 Drawing Sheets

FPGA SEARCH IN A CLOUD COMPUTE NODE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data relating to activity of machine components in the environment. The large amount and diversity of data systems containing large amounts of structured, semi-structured, and unstructured data can be massive, and continues to grow rapidly.

In many IT contexts, it can be desirable to analyze collected machine data to diagnose equipment performance problems, monitor user interactions, and/or to derive other insights. Such analysis can involve searching through the massive amounts of stored machine data to find relevant information, and processing the relevant information to obtain analysis results. As such, supporting efficient and accurate implementation of analysis functions can rely on a number of underlying technologies, such as efficient data storage technologies, efficient data search technologies, and efficient data processing technologies.

BRIEF DESCRIPTION OF THE DRAWINGS

Illustrative examples are described in detail below with reference to the following figures.

DETAILED DESCRIPTION

Figure 1:
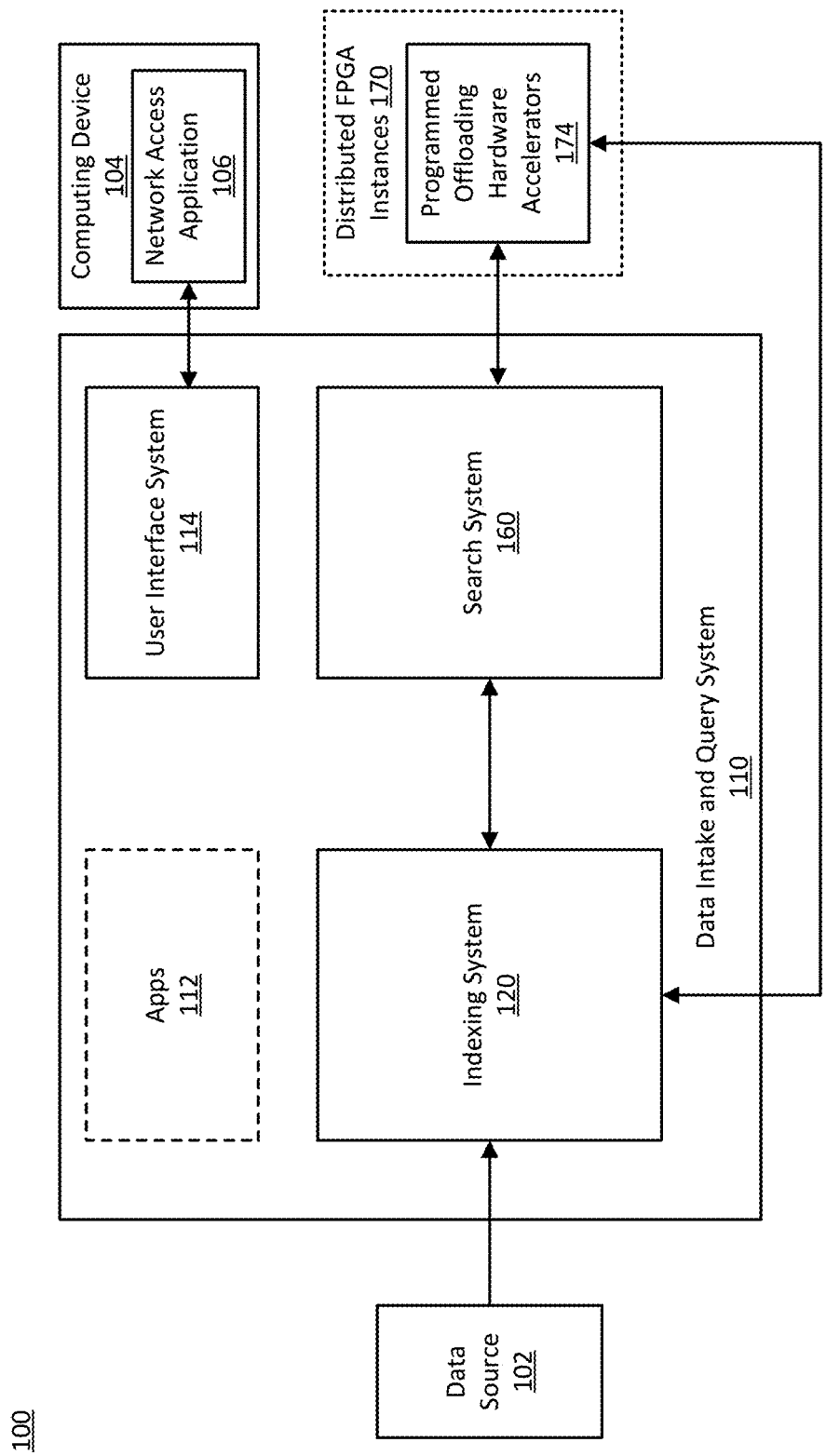
FIG. 1 is a block diagram illustrating an example computing environment that includes a data intake and query system.

Entities of various types, such as companies, educational institutions, medical facilities, governmental departments, and private individuals, among other examples, operate computing environments for various purposes. Computing environments, which can also be referred to as information technology (IT) environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

In many such computing environments, very large numbers of compute nodes work together to perform a large variety of computing tasks. As the compute nodes operate, they generate different types and formats of data (referred to herein generally as "machine data") reflecting activities of the compute node components. For example, machine data can be raw machine data that is generated by servers, sensors, routers, mobile devices, Internet of Things (IoT)

devices, and other compute node components, and the machine data can include system logs, network packet data, sensor data, application program data, error logs, stack traces, system performance data, and/or any other suitable types of structured, semi-structured, and/or unstructured data. In a large computing environment, vast amounts of such machine data is continually generated.

As noted above, it is typically desirable to have access to the generated machine data for analysis, such as to diagnose equipment performance problems, monitor user interactions, and/or to derive other insights. Such access relies on accumulating and storing the generated machine data in an efficient manner. Previously, systems tended to discard large portions of the data because of limitations on storage capacity and other resources. However, modern IT infrastructures tend to have access to vast (e.g., theoretically limitless) storage capacity, which can facilitate storage of massive quantities of minimally processed (e.g., raw) machine data for later retrieval and analysis.

Storage of, and consequent access to, larger amounts of minimally processed machine data can support greater variety and quality of analytic capabilities. However, successful implementation of such analytic capabilities can further rely on overcoming a number of technical challenges, such as to enable efficient search and processing of the large amounts of different types and formats of stored machine data. Some of these technical challenges are addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent a leading platform for providing real-time operational intelligence that enables organizations to collect, index, and search machine data from various websites, applications, servers, networks, and mobile devices that power their businesses. As described herein, such an event-based data intake and query system ingests machine data as events that can be indexed in relation to associated points in time (e.g., timestamps). Analysis of the machine data in such a system can exploit the event-based storage to support efficient searching to find relevant information. The located relevant information can then be processed to obtain and/or analyze search results.

While such event-based data intake and query systems can work well, there tends to be an ever-increasing demand for faster, larger, and/or more frequent analytics on continually increasing amounts of stored machine data. In many cases, the ability to continue to meet this demand is limited by availability of computing resources. For example, at any particular time, an IT environment may be generating massive amounts of machine data to be ingested (e.g., processed, indexed, and stored), while concurrently processing large numbers of complex search requests to support various types of analytics. Supporting those index-time and search-time operations can consume extensive computing resources.

Implementations described herein identify and exploit opportunities for offloading search-time operations to distributed hardware acceleration resources. Some implementations can additionally or alternatively be adapted for offloading index-time operations. An event-based data intake and query system can be implemented in a local computing core (or enterprise core, which can include cloud-based computing resources) for local processing, and the local computing core can be in communication with distributed hardware acceleration resources over one or more network interfaces, such as a cloud-based pool of field-programmable gate array (FPGA) instances. Certain search-time operations are predetermined to be off-loadable operations, and logic gates of each of multiple of the FPGA instances can be remotely programmed by the event-based data intake and query system to perform one or more of those off-loadable operations (e.g., such that the programmed FPGA instances effectively become part of the event-based data intake and query system). Implementations of the local computing core can process search-time operations using multiple parallel processing pipelines, where some of the pipelines are processed locally, and others of the pipelines are processed remotely by the programmed FPGA instances.

During operation, the local computing core receives search requests that are associated with search-time operations, including off-loadable operations and non-off-loadable operations. Non-off-loadable operations are assigned to processing threads for non-offloaded (e.g., local) processing to generate local results data. Off-loadable operations are assigned to processing threads that are distributed via a network interface to a set of (i.e., one or more) distributed FPGA engines, each having logic gates programmed to process one or more of the off-loadable operations. FPGA results data is received from the distributed FPGA engines via the network interface based on processing the off-loadable operations by the distributed FPGA engines. The local computing core can post-process the local results data and the FPGA results data to generate search results for at least a portion of the received search requests.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 1 is a block diagram illustrating an example computing environment 100 that includes a data intake and query system 110. The data intake and query system 110 obtains data from a data source 102 in the computing environment 100 and ingests the data using an indexing system 120. A search system 160 of the data intake and query system 110 enables users to navigate the indexed data. Though drawn with separate boxes, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," initiating of searches, and generation of reports, among other operations. The data intake and query system 110 can further optionally include apps 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can execute on a single computing device, or may be distributed over multiple computing devices. For example, the program code can include instructions for executing both indexing and search components (which may be part of the indexing system 120 and/or the search system 160, respectively), and can be executed on a computing device that also provides the data source 102. As another example, the program code can execute on one computing device, where the program code executes both indexing and search components, while another copy of the program code executes on a second computing device that provides the data source 102. As another example, the program code can execute only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 120 obtains machine date from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing system 120. As discussed in greater detail below, the search system 160 enables users associated with the computing environment 100 (and possibly also other users) to navigate the data, generate reports, and visualize results in "dashboards" output using a graphical interface. Using the facilities of the search system 160, users can obtain insights about the data, such as retrieving events from an index, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries to the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, which can a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 104. In such examples, the network access application 106 can access the user interface system 114 without needed to go over a network.

The data intake and query system 110 can optionally include apps 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

In some implementations, components of the data intake and query system 110 can access distributed field-programmable gate array (FPGA) instances 170 via one or more network interfaces. The distributed FPGA instances 170 can include logic gates that can be remotely programmed to provide hardware acceleration of particular functions. For example, programming of the FPGA instances can be defined as code in any suitable programming language (e.g., Verilog, C++, etc.); the code can be compiled and converted (e.g., by any suitable computer) into a corresponding bitstream for programming the FPGA instances in accordance with one or more hardware specifications, data protocols, function libraries, etc.; and the bitstream can be communicated to the distributed FPGA instances 170 over a Peripheral Component Interconnect Express (PCIe) network interface by the data intake and query system 110.

After any instance of the distributed FPGA instances 170 has been programmed by the data intake and query system 110, the instance becomes a programmed offloading hardware accelerator (POHA) 174. For example, the programming converts a general-purpose pooled hardware resource into an additional dedicated hardware resource that can be exploited as part of the data intake and query system 110. Each programmed offloading hardware accelerator 174 can be considered as a temporary part of the computing environment 100, such that the computing environment 100 can include on-prem computing resources, cloud computing resources, and offloading hardware resources.

The illustrated implementation shows the search system 160 in communication with the programmed offloading hardware accelerators 174 over the network interface. In such a configuration, the programmed offloading hardware accelerators 174 are programmed to perform search-time operations previously classified as off-loadable operations. For example, parsing and matching of regular expression (regex) queries, compression and/or decompression, automated extraction of fields from log files, automated extraction and/or indexing of Internet Protocol (IP) addresses, and/or other such operations can be classified as off-loadable operations. In other implementations, alternatively or additionally, the indexing system 120 can be in communication with the programmed offloading hardware accelerators 174. In such implementations, the programmed offloading hardware accelerators 174 are programmed to perform index-time operations previously classified as off-loadable operations.

Implementations of the data intake and query system 110 (e.g., of the search system 160 and/or the indexing system 120) are configured to exploit the programmed offloading hardware accelerators 174 to enable parallel processing, hardware acceleration, dynamic compute-resource scaling, and/or load balancing. For example, local computing resources of the data intake and query system 110 can be used to process operations classified as non-off-loadable, and the programmed offloading hardware accelerators 174 can be used concurrently to process other operations classified as off-loadable. Implementations of the data intake and query system 110 can include various function libraries, protocol support, and/or other features to facilitate offloading to the programmed offloading hardware accelerators 174. For example, when a non-off-loadable operation is encountered, the operation and associated data are sent to local software and/or hardware processing resources. When an off-loadable operation is encountered, the data intake and query system 110 can send the data and any supporting information (e.g., addressing information, function calls, etc.) over the network interface to one or more appropriate programmed offloading hardware accelerators 174. Results of the off-loaded processing by the one or more programmed offloading hardware accelerators 174 can be returned back to the local compute resources of the data intake and query system 110 for further processing.

Figure 2:
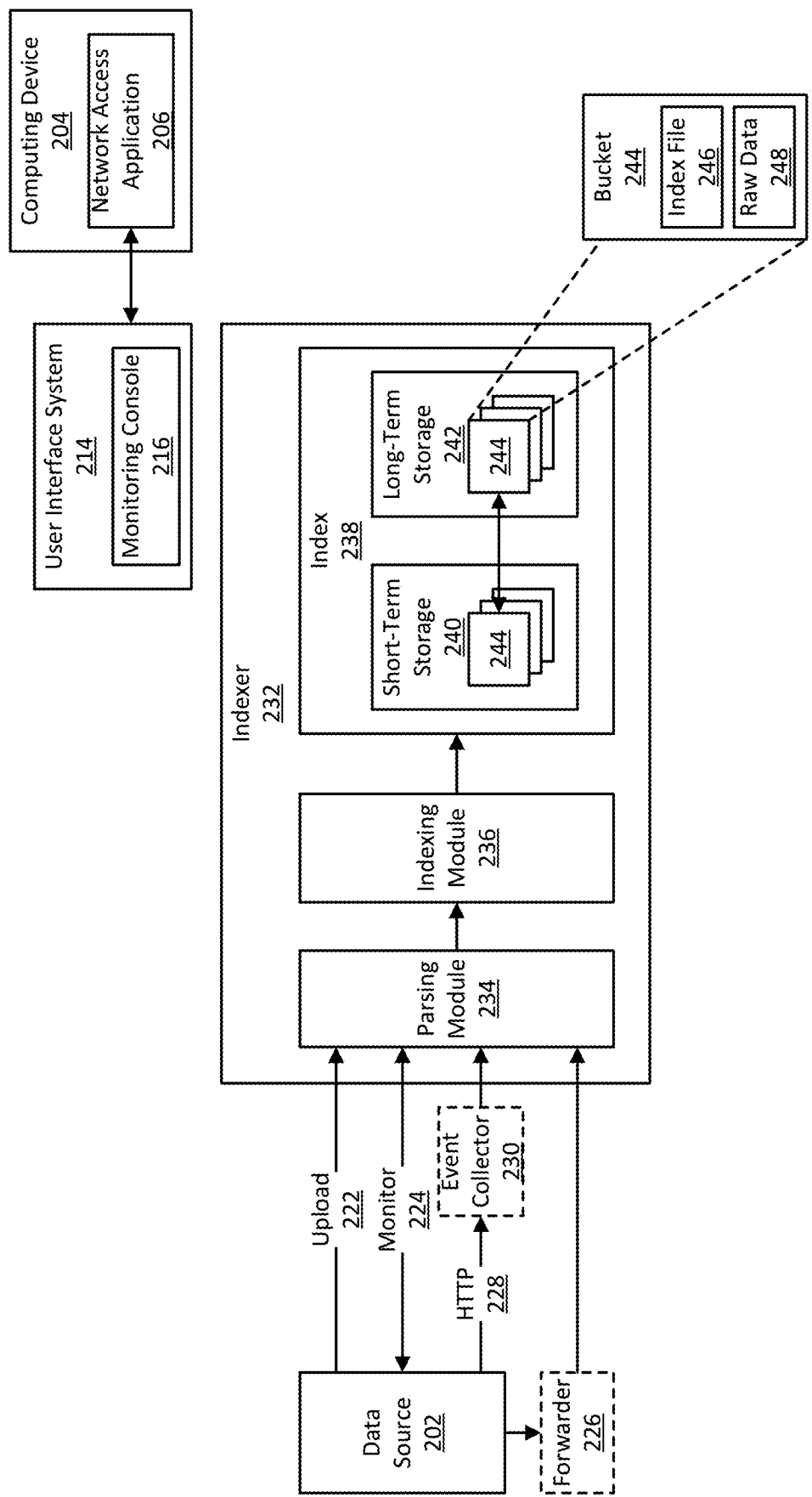
FIG. 2 is a block diagram illustrating in greater detail an example of an indexing system of a data intake and query system, such as the data intake and query system of FIG. 1.
Figure 3:
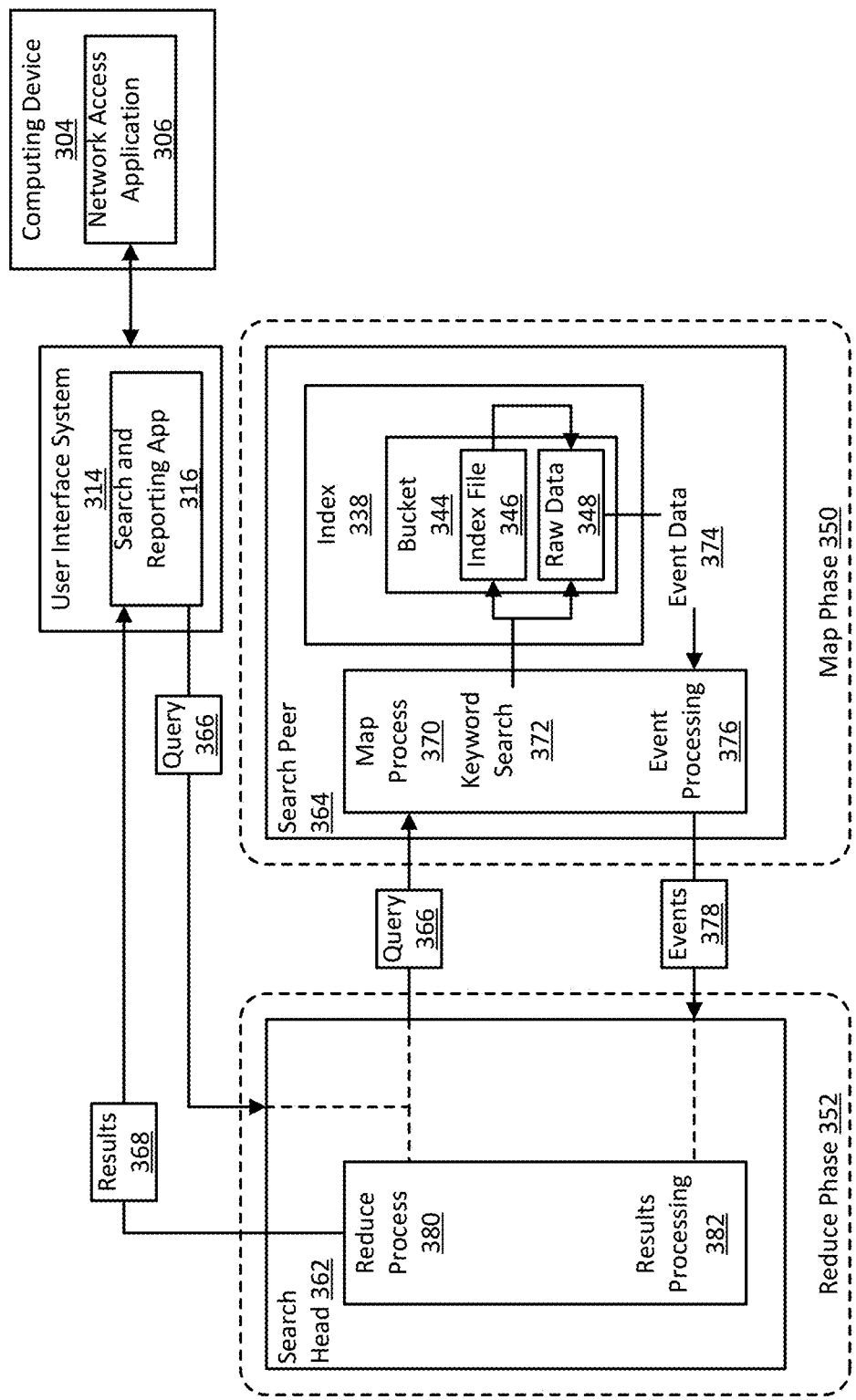
FIG. 3 is a block diagram illustrating in greater detail an example of the search system of a data intake and query system, such as the data intake and query system of FIG. 1.

FIGS. 2 and 3 describe implementations of the indexing system 120 and the search system 160 in more detail, respectively, without reference to the distributed FPGA instances 170. These descriptions highlight various components and features of the indexing system 120 and the search system 160, illustrating various index-time and search-time operations. As described herein, the indexing system 120 and/or the search system 160 can be communicatively coupled with the distributed FPGA instances 170 via one or more network interfaces and can be configured to exploit programmed offloading hardware accelerators 174 for off-loaded processing of pre-classified ones of the described index-time and/or search-time operations.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 238 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for indexing; configuring the indexer 232 to index the data from the data source 232; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further below.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g., a magnetic, optical, or solid-state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP) 228 and an event collector 230. These and other methods for data ingestion may be referred to as "getting data in" (GDI) methods.

Using the upload 222 method, a user can instruct the indexing system to 202 to specify a file for uploading into the indexer 232. For example, the monitoring console 216 can include commands or an interface through which the user can specify where the file is located (e.g., on which computing device and/or in which directory of a file system) and the name of the file. Once uploading is initiated, the indexer 232 processes the file, as discussed further below. Uploading is a manual process and occurs when instigated by a user. For automated data ingestion, the other ingestion methods are used.

The monitor 224 method enables the indexing system 202 to monitor the data source 202 and continuously or periodically obtain data produced by the data source 202 for ingestion by the indexer 232. For example, using the monitoring console 216, a user can specify a file or directory for monitoring. In this example, the indexing system 202 can execute a monitoring process that detects whenever data is added to the file or directory and causes the data to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further below) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executing on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and keep separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events or event data to one or more indexers. Extracting the events can include associating any metadata in a request with the event or events included in the request. In these implementations, event generation by the indexer 232 (discussed further below) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been added to an index.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated to facilitate discussion, with the understanding that implementations with other components are possible to achieve the same functionality.

The parsing module 234 determines information about event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field or using machine learning.

Other information that the parsing module 234 can determine includes timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing component 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 246, to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

Building index data structures generates the index 238. The index 238 is a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 238 has access to over a network. The indexer 232 can include more than one index and can include indexes of different types. For example, the indexer 232 can include event indexes, which impose minimal structure on stored data and can accommodate any type of data. As another example, the indexer 232 can include metrics indexes, which use a highly structured format to handle the higher volume and lower latency demands associated with metrics data.

The indexing module 236 organizes files in the index 238 in directories referred to as buckets. The files in a bucket 244 can include raw data files, index files, and possibly also other metadata files. As used herein, "raw data" means data as when the data was produced by the data source 202, without alteration to the format or content. As noted previously, the parsing component 234 may add fields to event data and/or perform transformations on fields in the event data, and thus a raw data file 248 can include, in addition to or instead of raw data, what is referred to herein as enriched raw data. The raw data file 248 may be compressed to reduce disk usage. An index file 246, which may also be referred to herein as a "time-series index" or tsidx file, contains metadata that the indexer 232 can use to search a corresponding raw data file 248. As noted above, the metadata in the index file 246 includes a lexicon of the event data, which associates each unique keyword in the event data in the raw data file 248 with a reference to the location of event data within the raw data file 248. The keyword data in the index file 246 may also be referred to as an inverted index. In various implementations, the data intake and query system can use index files for other purposes, such as to store data summarizations that can be used to accelerate searches.

A bucket 244 includes event data for a particular range of time. The indexing module 236 arranges buckets in the index 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may move from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the index 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to a search peer 364. Using a map process 370, the search peer 364 searches the appropriate index 338 for events identified by the query 366 and sends events 378 so identified back to the search head 362. Using a reduce process 382, the search head 362 processes the events 378 and produces results 368 to respond to the query 366. The results 368 can provide useful insights about the data stored in the index 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 may be referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands that the search peer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("I" or "pipe") symbol.

In addition to one or more search commands, the query 366 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more search peers. In the map phase 350, the search peers locate event data that matches the search terms in the search query 366 and sorts the event data into field-value pairs. When the map phase 350 is complete, the search peers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more search peers, such as the search peer 364 illustrated in FIG. 3. "Search peer" is an alternate name for "indexer" and a search peer may be largely similar to the indexer described previously. The search peer 364 may be referred to as a "peer node" when the search peer 364 is part of an indexer cluster. The search peer 364, which may also be referred to as a search execution component, can be implemented using program code that can be executed on a computing device. In some implementations, one set of program code implements both the search head 362 and the search peer 364 such that the search head 362 and the search peer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular search peer 364. For example, the search system 360 may be configured to include multiple search peers that each have duplicative copies of at least some of the event data. In this example, the sending the search query 366 to more than one search peer allows the search system 360 to distribute the search workload across different hardware resources. As another example, search system 360 may include different search peers for different purposes (e.g., one has an index storing a first type of data or from a first data source while a second has an index storing a second type of data or from a second data source). In this example, the search query 366 may specify which indexes to search, and the search head 362 will send the query 366 to the search peers that have those indexes.

To identify events 378 to send back to the search head 362, the search peer 364 performs a map process 370 to obtain event data 374 from the index 338 that is maintained by the search peer 364. During a first phase of the map process 370, the search peer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the search peer 364 performs a keyword search 374 using search terms specified in the search query 366. The search terms can be one or more of keywords, phrases, fields, Boolean expressions, and/or comparison expressions that in combination describe events being searched for. When segmentation is enabled at index time, the search peer 364 performs the keyword search 372 on the bucket's index file 346. As noted previously, the index file 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index file 346 that matches query 366, the search peer 364 can use the location references to extract from the raw data 348 file the event data 374 for each event that include the searchable term.

In cases where segmentation was disabled at index time, the search peer 364 performs the keyword search 372 directly on the raw data 348 file. To search the raw data 348, the search peer 364 may identify searchable segments in events in a similar manner as when the data was indexed. Thus, depending on how the search peer 364 is configured, the search peer 364 may look at event fields and/or parts of event fields to determine whether an event matches the query 366. Any matching events can be added to the event data 374 read from the raw data 348 file. The search peer 364 can further be configured to enable segmentation at search time, so that searching of the index 338 causes the search peer 364 to build a lexicon in the index file 346.

The event data 374 obtained from the raw data 348 file includes the full text of each event found by the keyword search 372. During a third phase of the map process 370, the search peer 364 performs event processing 376 on the event data 374, with the steps performed being determined by the configuration of the search peer 364 and/or commands in the search query 366. For example, the search peer 364 can be configured to perform field discovery and field extraction. Field discovery is a process by which the search peer 364 identifies and extracts key-value pairs from the events in the event data 374. The search peer 364 can, for example, be configured to automatically extract the first 100 fields (or another number of fields) in the event data 374 that can be identified as key-value pairs. As another example, the search peer 364 can extract any fields explicitly mentioned in the search query 366. The search peer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 364 sends processed events 378 to the search head 362, which performs a reduce process 380. The reduce process 380 potentially receives events from multiple search peers and performs various results processing 382 steps on the events. The results processing 382 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

Through results processing 382, the reduce process 380 produces the events found by processing the search query 366, as well as some information about the events, which the search head 362 outputs to the search and reporting app 316 as search results 368. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Chloropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 316. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 4:
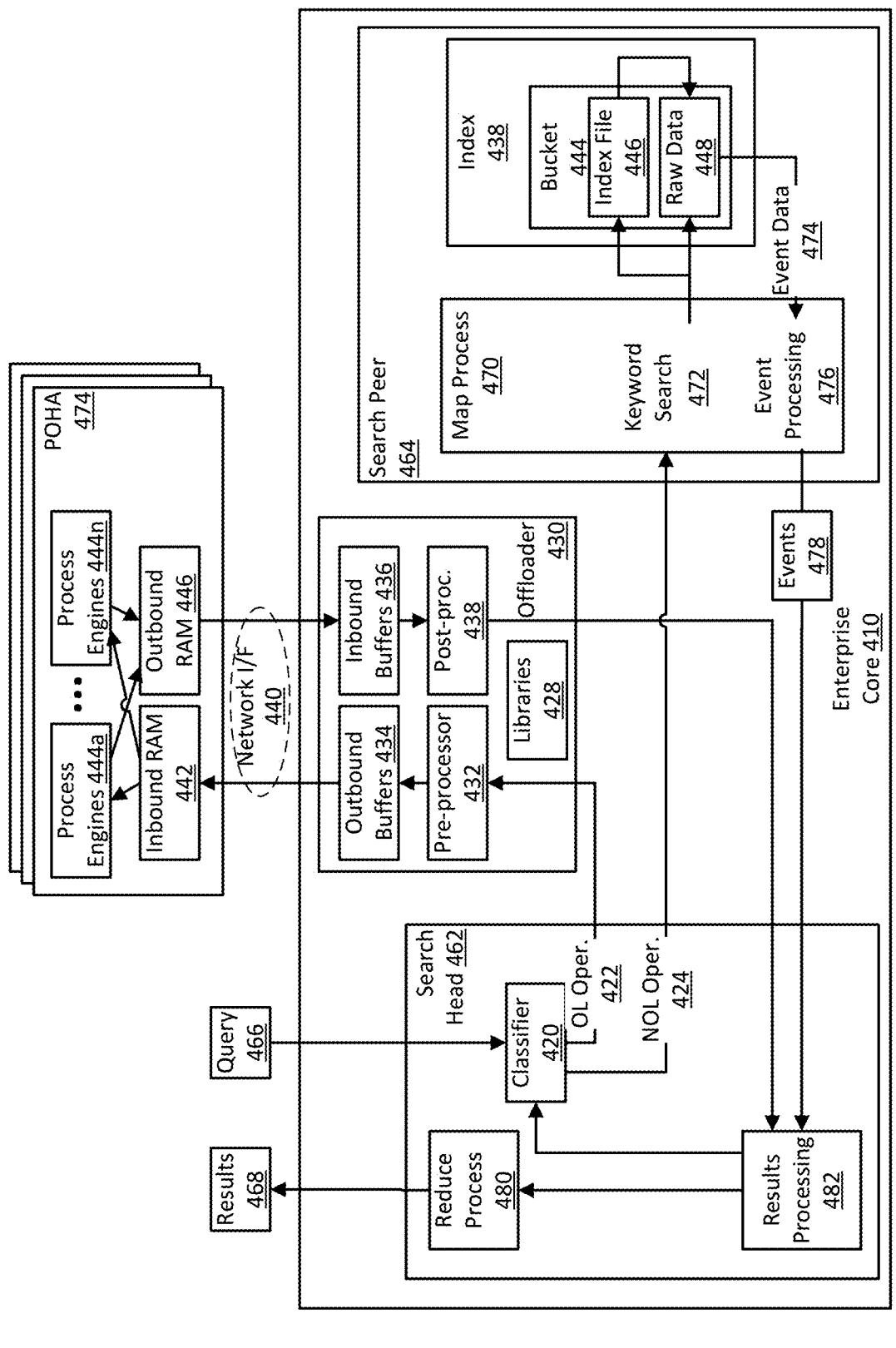
FIG. 4 is a block diagram illustrating an example of one category of implementations of the search system of a data intake and query system that exploit programmed offloading hardware accelerators for offloading of search-time operations.

FIG. 4 is a block diagram illustrating an example of one category of implementations of the search system 460 of a data intake and query system that exploit programmed offloading hardware accelerators 474 for offloading of search-time operations. The search system 460 can be an implementation of the search system 160 of the data intake and query system 110 of FIG. 1. In general, the search system 460 includes a search head 462 and one or more search peers 464, which can operate in accordance with the descriptions of the search head 362 and the search peer 364 of FIG. 3, respectively. For example, the search head 462 receives a query 466, which it forwards to an appropriate search peer 464, and the search peer 464 uses a map process 470 to search the appropriate index 438 for events identified by the query 466 and to send events 478 so identified back to the search head 462. The search head 462 can use a reduce process 482 to processes the events 478 and produces results 468 in response to the query 466.

As illustrated, implementations of the search system 460 can include an enterprise core 410 and offloading hardware resources. As described above, the enterprise core 410 can include on-prem and/or cloud-based computing resources. The search head 462 and the one or more search peers 464 can be implemented as part of the enterprise core 410. As part of the enterprise core 410, each search peer 464 can also have access to event data 474 in an index 438 (e.g., in one or more memory locations). For example, the index 438 is organized with buckets 444 that can each include raw data 448. Each bucket 444 can also include an index file 446 in cases where segmentation was enabled at index time. Though not shown, components of an indexing system, and/or other components of a data intake and query system can also be implemented by the enterprise core 410. One or more enterprise core 410 components (e.g., the search head 462) can be in communication with the offloading hardware resources via one or more network interfaces 440. For example, the one or more network interfaces 440 can include PCIe interfaces. For example, as described above, distributed FPGA instances 170 can be accessible to enterprise core 410 components via the network interfaces 440 and can have logic gates that can be remotely programmed to provide hardware acceleration of particular functions. Programming of any of the distributed FPGA instances 170 can convert that instance into a programmed offloading hardware accelerator 474, which becomes a component of the search system 460.

As illustrated, when the search head 462 receives the query 466, the query 466 can be analyzed by a classifier 420. The classifier 420 can determine one or more search-time operations associated with processing the query 466 and can classify those one or more search-time operations as off-loadable (OL) operations 422 and non-off-loadable (NOL) operations 424. Non-off-loadable operations 424 are intended for "local" processing by the enterprise core 410 components, and off-loadable operations 422 are intended for offloaded processing by one or more programmed offloading hardware accelerators 474. For example, processing of queries 466 can involve parsing of search terms, which can include one or more of keywords, phrases, fields, Boolean expressions, and/or comparison expressions that in combination describe events being searched for. In some cases, such processing involves particular types of operations predetermined to be appropriate candidates for off-loading, and other types of operations predetermined not to be appropriate candidates for off-loading.

In some cases, classification of an operation as non-off-loadable indicates that the operation is of a type that cannot be offloaded for security or policy reasons, that the operation is not of a type supported by or processable by the programmed offloading hardware accelerators 474, and/or that otherwise cannot be offloaded due to some technical or non-technical barrier. In other cases, classification of an operation as non-off-loadable indicates that the operation is predetermined not to be offloaded, even if it is of a type for which there is no technical or non-technical barrier to offloading (e.g., there is no policy or technical barrier to offloading). For example, it may be determined that certain types of operations are not worth offloading because overhead associated with offloading the operation exceeds the cost of processing the operation without offloading. In some implementations, the operations predetermined to be candidates for off-loading are those operations that tend to occur frequently, tend to consume an appreciable amount of computational resources, and are able to be efficiently performed by a hardware accelerator. One such operation, described in more detail below, is parsing of regular expression (regex) strings. For example, the search processing language (described above) can support use of regex strings, and parsing and matching of such strings can tend to occur frequently, to be relatively computationally resource intensive, and to be performed by a properly programmed hardware accelerator.

For any particular query 466, the classifier 420 can determine one or more non-off-loadable operations 424 and one or more off-loadable operations 422. Any non-off-loadable operations 424 can be handled in the same manner described with reference to FIG. 3. For example, the non-off-loadable operations 424 are sent to the search peer 464. As part of a map phase 450, the search peer 464 can locate event data 474 that matches the search terms in the search query 466, can sort the event data 474 into field-value pairs, and can send associated events 478 back to the search head 462. The search head 462 can perform results processing 482 and a reduce phase 480 to produce one or more search results 468 responsive to the query 466.

Off-loadable operations 422 can be sent to an offloader 430. While only one offloader 430 is shown, some implementations can include multiple offloader 430 instances. As illustrated, the offloader 430 includes a pre-processor 432, outbound buffers 434, inbound buffers 436, and a post-processor 438. Each off-loadable operation 422 can be passed to the pre-processor 432, which can manage the offloading, such as by determining which of multiple programmed offloading hardware accelerators 474 are available and are programmed for processing the particular type of off-loadable operation 422, and/or by load balancing between multiple programmed offloading hardware accelerators 474 and/or process engines 444 of a programmed offloading hardware accelerator 474. Based on the determination, the off-loadable operation 422 can be passed to one of the outbound buffers 434. For example, the outbound buffers 434 can be implemented as so-called "ping-pong" buffers, so that off-loadable operations 422 can be loaded into (e.g., written to) one or more of the outbound buffers 434 while off-loadable operations 422 are concurrently being sent out (e.g., read out) of one or more of the outbound buffers 434 over the network interface(s) 440. In some implementations, the outbound buffers 434 are aligned to process engines 444 of the programmed offloading hardware accelerators 474. For example, the pre-processor 432 selects to which of the outbound buffers 434 to send each off-loadable operation 422 based on load balancing and/or otherwise discriminating between multiple potential process engines 444 of the programmed offloading hardware accelerators 474.

The off-loadable operations 422 are transmitted from the outbound buffers 434 over the network interface(s) 440 to an appropriate one of the programmed offloading hardware accelerators 474. As illustrated, the search system 460 can be in communication with multiple (e.g., a bank of) programmed offloading hardware accelerators 474 that can be programmed to handle the same, or different types of off-loadable operations 422. As described above, each programmed offloading hardware accelerator 474 can be implemented as an FPGA instance, or other suitable programmable hardware acceleration instance. For example, a distributed, shared, networked pool of FPGAs (e.g., FPGA instances 170 of FIG. 1 above) is made available by a provider of such shared hardware acceleration services. Each FPGA has logic gates and/or other circuitry that are configured to be programmable according to particular function libraries, bitstream formats, data protocols, etc., as defined by the hardware manufacturers, hardware acceleration service providers, and/or other entities. The offloader 430 includes libraries 428 by which processing specifications can be defined for off-loadable operations 422 in a manner that can be converted into programming data (e.g., bitstreams) compatible with the programmed offloading hardware accelerators 474. For example, the processing specifications can be defined in Very High-Speed Integrated Circuit Hardware Description Language (VHDL), Verilog, C++, OpenCL, high-level synthesis (HLS) coding, register transfer level (RTL) coding, and/or any other suitable programming language or other hardware description language. As such, the offloader 430 can generate and communicate information by which certain ones of the programmable hardware acceleration instances are programmed to be converted into programmed offloading hardware accelerators 474.

Once programmed, the programmed offloading hardware accelerator 474 can be considered as a bank of process engines 444 (illustrated as N process engines labeled 444*a* through 444*n*). Each programmed offloading hardware accelerator 474 can also include inbound memory 442 and outbound memory 446. The inbound memory 442 and outbound memory 446 can be implemented as any suitable random-access memory (RAM), or the like, such as double data-rate synchronous dynamic RAM (DDR-SDRAM). For example, off-loadable operations 422 are transferred over the network interface 440 from one of the outbound buffers 434 of the offloader 430 to the inbound memory 442 of one of the programmed offloading hardware accelerators 474. The transferred off-loadable operations 422 may be directed to one of the process engines 444 for offloaded processing. For example, each off-loadable operation 422 can be transferred in accordance with a data protocol (e.g., using metadata, packet formats, etc.) that addresses the transfer to a particular programmed offloading hardware accelerator 474 and/or to a particular process engine 444 of the particular programmed offloading hardware accelerator 474. Results of the offloaded processing can be temporarily stored in the outbound memory 446, such as by queuing, buffering, etc. until the offloaded processing results can be transferred back to the offloader 430 over the network interface 440.

Implementations of the offloader 430 can receive the offloaded processing results at the inbound buffers 436, which can also be implemented as ping-pong buffers, or in any other suitable manner. The received offloaded processing results can be passed to the post-processor 438. For example, as noted above, the offloaded processing is typically used to process off-loadable operations 422 that are part of generating one or more results 468 of one or more queries 466. As such, the post-processor 438 can convert the offloaded processing results into data that is useful to furthering results processing 482 of the search head 462.

In some cases, the offloaded processing results reflect a successful processing of an off-loadable operation 422. In such cases, the results processing 482 can use those offloaded processing results along with results of successfully processed non-off-loadable operations 424 (e.g., retrieved events 478) to generate one or more query results 468. As one example of such cases, the results processing 482 can use offloaded processing results to generate or facilitate definition of search-time operations, such as additional non-off-loadable operations 424. For example, prior to sending certain data and/or search-time operation commands to the search peer 464, the offloaded processing is used to parse, decrypt, decompress, or otherwise process those data and/or search-time operation commands to facilitate the query 466. As another example of such cases, the offloaded processing is used to parse, decrypt, decompress, filter, search, or otherwise process results of one or more non-off-loadable operations 424. For example, non-off-loadable operations 424 can be used by the search peer 464 to generate a candidate set of events 478, and offloaded processing can be used to parse search strings (e.g., regex strings) and to compare the candidate set of events 478 to the parsed search strings to obtain a final set of query results 468.

In other cases, the offloaded processing results reflect an unsuccessful processing of an off-loadable operation 422. In some such cases, the processing failure reflects that the processing could be performed by the programmed offloading hardware accelerator 474, but resulted in an error condition. In other such cases, the processing failure reflects that the processing could not be performed by the programmed offloading hardware accelerator 474. For example, the processing may have resulted in exceeding of a buffer size, exceeding of a maximum string size, among other examples. In accordance with unsuccessful processing by the programmed offloading hardware accelerators 474, implementations of the post-processor 438 can generate an error flag and/or any suitable error information for use by the results processing 482. In some cases, in response to such an error indication, the results processing 482 can log and/or report the error. In some cases, in response to such an error indication, the results processing 482 can attempt to reprocess the search-time operation in the enterprise core 410 without offloading (e.g., the operation is retagged as a non-off-loadable operation 424).

Figure 5:
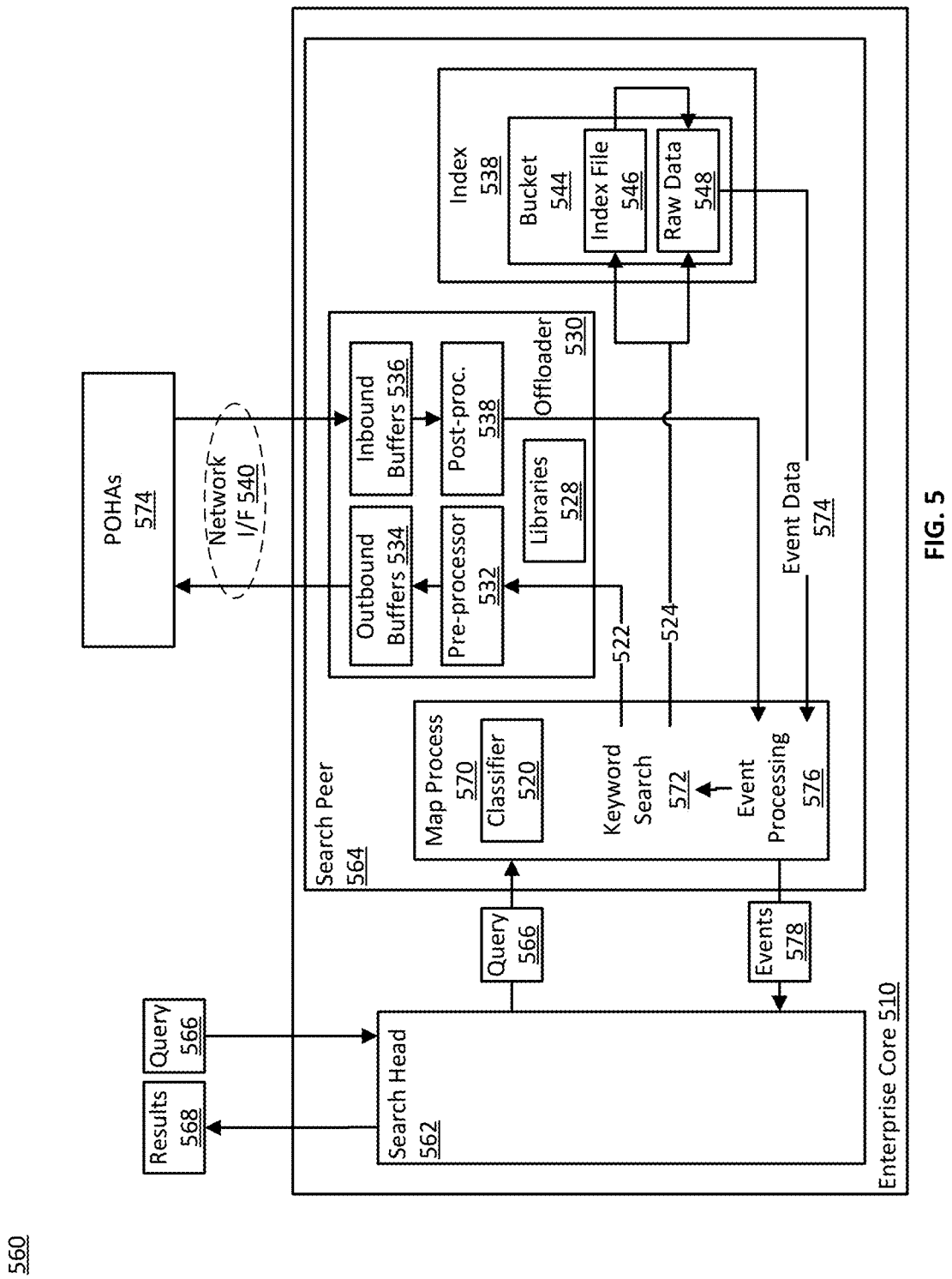
FIG. 5 is a block diagram illustrating an example of another category of implementations of the search system of a data intake and query system that exploit programmed offloading hardware accelerators for offloading of search-time operations.

FIG. 5 is a block diagram illustrating an example of another category of implementations of the search system 560 of a data intake and query system that exploit programmed offloading hardware accelerators 574 for offloading of search-time operations. The search system 560 can be an implementation of the search system 160 of the data intake and query system 110 of FIG. 1. In general, the search system 560 includes a search head 562 and one or more search peers 564, which can operate in accordance with the descriptions of the search head 362 and the search peer 364 of FIG. 3, respectively. The search system 560 can further operate in a similar manner to the search system 460 of FIG. 4, except that each of some or all of the search peers 564 can include a respective instance of an offloader 530. As illustrated, the search head 562 and one or more search peers 564 can be implemented in an enterprise core 510. Also as part of the enterprise core 510, each search peer 564 can also have access to event data 574 in an index 538 (e.g., in one or more memory locations). For example, the index 538 is organized with buckets 544 that can each include raw data 548. Each bucket 544 can also include an index file 546 in cases where segmentation was enabled at index time.

Each instance of the offloader 530 facilitates offloading to one or more programmed offloading hardware accelerators 574, via one or more network interfaces 540, for offloaded processing of off-loadable operations 522 by the search peer 564 in which it is implemented. As described above, the offloader 530 includes libraries 528 (e.g., including any function libraries, protocol support, etc.) by which processing specifications can be defined for off-loadable operations 522 in a manner that can be converted into programming data (e.g., bitstreams) compatible with the programmed offloading hardware accelerators 574.

As described above, the search head 562 receives a query 566, which it forwards to an appropriate search peer 564, and the search peer 564 uses a map process 570 to search the appropriate index 538 for events identified by the query 566 and to send events 578 so identified back to the search head 562. The search head 562 can use a reduce process 582 to processes the events 578 and produces results 568 in response to the query 566. The map process 570 at the search peer 564 can include a classifier 520. When the query 566 is received by the search peer 564, the classifier 520 can determine one or more search-time operations associated with processing the query 566 and can classify those one or more search-time operations as off-loadable operations 522 and non-off-loadable operations 524. Such classification can be substantially as described above with reference to FIG. 4.

Any classified non-off-loadable operations 524 can be handled by the enterprise core 510 components of the search peer 564, such as described with reference to FIG. 3. Off-loadable operations 522 can be sent to the offloader 530. The offloader 530 can operate in substantially the same manner as, and can include substantially the same components as, described with reference to FIG. 4. For example, the offloader 530 includes a pre-processor 532, outbound buffers 534, inbound buffers 536, and a post-processor 538. Off-loadable operations 522 can be passed to the pre-processor 532, which can determine where to send the off-loadable operations 522 for offloaded processing (e.g., to which programmed offloading hardware accelerators 574, to which process engine within the programmed offloading hardware accelerators 574, etc.). Based on the determination, each off-loadable operation 522 can be passed to one of the outbound buffers 534 and transferred from there to an appropriate process engine of an appropriate programmed offloading hardware accelerator 574 via the network interface 540. The transferred off-loadable operations 522 can be processed by the programmed offloading hardware accelerators 574, and offloaded processing results can be transferred back to the offloader 530 over the network interface 540. Implementations of the offloader 530 can receive the offloaded processing results at the inbound buffers 536 and can pass the received offloaded processing results to the post-processor 538.

The post-processor 538 can pass the offloaded processing results, or information relating to the offloaded processing results, back to event processing 576 of the map process 570. As described above, the output from the post-processor 538 can reflect various types of cases, such as successful processing of an off-loadable operation 522, or unsuccessful offloaded processing of an off-loadable operation 522. Responsive to indications of unsuccessful offloaded processing, the event processing 576 can be triggered to log the unsuccessful processing (e.g., as a processing error); to attempt to fix the condition, such as by adjusting a parameter of the off-loadable operation 522 and sending the adjusted off-loadable operation 522 back to the offloader 530; or to process the off-loadable operation 522 without offloading, such as using enterprise core 510 resources. Responsive to indications of successful offloaded processing, the event processing 576 can use the received offloaded processing results, or received information relating to the offloaded processing results, to facilitate generation of an events 578 output to send back to the search head 562. For example, non-off-loadable operations 524 can be used to generate an initial set of event data 574, and off-loadable operations 522 can be used, along with the initial set of event data 574 to find matching search strings, or the like.

Figure 6:
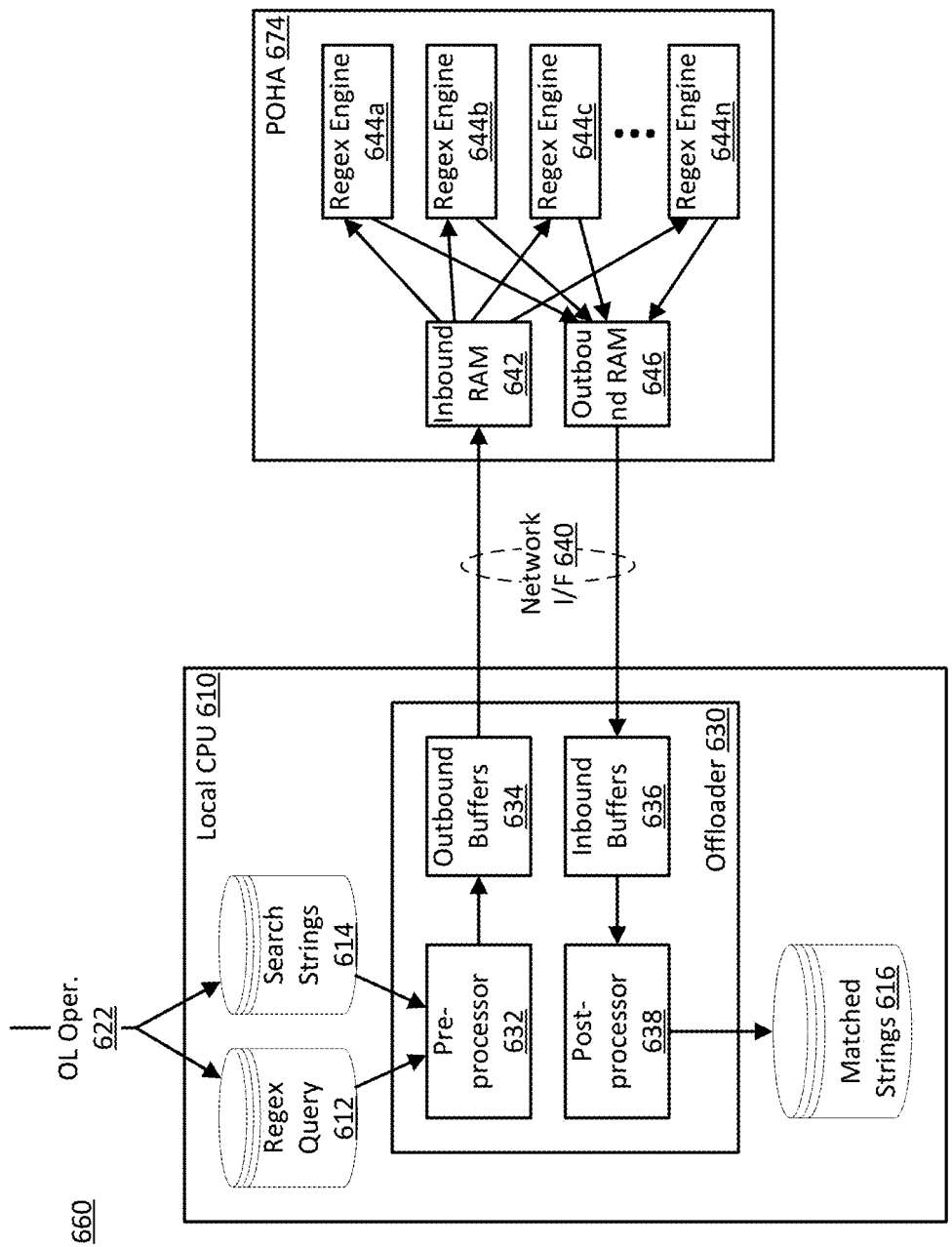
FIG. 6 is a block diagram illustrating a simplified example of a portion of a search system of a data intake and query system that exploits programmed offloading hardware accelerators for offloading of regular expression (regex) query processing.

FIG. 6 is a block diagram illustrating a simplified example of a portion of a search system 660 of a data intake and query system that exploits programmed offloading hardware accelerators 674 for offloading of regular expression (regex) query processing. The search system 660 can represent a specific use case of implementations described above, such as of the search system 160 of FIG. 1, the search system 460 of FIG. 4, or the search system 560 of FIG. 5. The illustrated implementation shows a local CPU 610 in communication with one or more programmed offloading hardware accelerators 674 via one or more network interfaces 640. Only an offloader 630, and input and output data of the offloader 630, are shown in the local CPU 610. The local CPU 610 can be a portion of an enterprise core, such as described above. Though referred to as "local," the local CPU 610 can be implemented on-prem, in the cloud, and/or in any other suitable manner as differentiated from the offloaded hardware acceleration functions of the programmed offloading hardware accelerators 674.

The input to the illustrated portion of the search system 660 is a particular type of off-loadable operation 622 relating to a search and regex query. It can be assumed based on the above description that such off-loadable operations 622 were classified as such by a classifier of the search system 660, even though the classifier is not explicitly shown. For example, the search processing language includes a number of different types of commands, function calls, classes, etc. Upon encountering a particular bundled "search and regex" command, or the like, the classifier is configured to classify such a command as an off-loadable operation 622. Such classification can also involve identifying the particular type off-loadable operation 622, so that offloaders and/or other downstream components process the operation properly (e.g., by sending such an operation to programmed offloading hardware accelerators that have been programmed for regex query processing).

The off-loadable operations 622 can include any relevant search operations and related information. The illustrated off-loadable operations 622 relate to regex processing. A regular expression, or regex, is a manner of using a pattern of symbols in a string to represent a certain amount of text. For example, in one regex implementation, the regex "to(o) ?" can be used to match either "to" or "too"; in another regex implementation, the regex "(to|too)" can be used to match either "to" or "too." Many different regex specifications have been defined (e.g., in PCRE (Perl Compatible Regular Expressions), JavaScript, VBScript, Python, Ruby, etc.), and those different specifications tend to have incompatible symbol definitions, syntax, behavior, and/or other properties. In context of the search system 660, regexes can be used for matching strings, extracting default fields, recognizing binary file types, automatic assignation of source types, defining custom field extractions, filtering events, routing data, correlating searches, and/or for other purposes.

In the illustrated case of regex processing, the off-loadable operations 622 use regex to iterate over search results (i.e., search strings 614) to determine whether each search string 614 matches one or more regex queries 612. As such, the off-loadable operation 622 information sent to the offloader 630 includes both the search strings 614 and the regex queries 612. As an example, a regex query 612 can be written as: "index=myindex|regex colour='bl\w+'." Such a regex query 612 would match search strings 614 corresponding to events (e.g., in an index called "myindex", which can be an index of an associated search peer) where the key "colour" has a value beginning with "bl" (e.g., "black", "blue", etc.). As another example, a regex query 612 can be written as: "^[a-c]+s$." Such a regex query 612 would match search strings 614, such as "apple", "cabs", etc.

Similar to offloader implementations described above, the offloader 630 includes a pre-processor 632, outbound buffers 634, inbound buffers 636, and a post-processor 638. Similar to programmed offloading hardware accelerators described above, the programmed offloading hardware accelerator 674 includes inbound memory 642, outbound memory 646, and a number of process engines. It is assumed that the programmed offloading hardware accelerator 674 has been programmed for regex processing, such that the process engines are illustrated specifically as regex engines 644.

The pre-processor 632 can assign the search strings 614 (e.g., in an evenly distributed manner) to the multiple regex engines 644. In some implementations, the pre-processor 632 writes a respective portion of the search strings 614 (e.g., and the regex query 612) in ping-pong fashion to the outbound buffers 634. For example, the outbound buffers 634 include two buffers: while one buffer is being populated with search strings 614, previously populated search strings 614 in the other buffer are being transferred across the network interface 640 to the inbound memory 642 of the programmed offloading hardware accelerator 674. After being transferred over to the inbound memory 642 of the programmed offloading hardware accelerator 674, search strings 614 are distributed to the regex engines 644 in accordance with the assignments made by the pre-processor 632. For example, the programmed offloading hardware accelerator 674 includes eleven regex engines 644 that can operate in parallel to hardware-accelerate processing of its assigned respective portion of the search strings 614.

The regex engines 644 can be configured to output a match flag for each search string 614 indicating whether the search string 614 matched the regex query 612. Some implementations can output alternative or additional information, such as an index of any capture groups, if applicable. For example, a capture group is a regular expression grouping that extracts a field value when regular expression matches an event. Capture groups include the name of the field. In some implementations, they are notated with angle brackets as follows: "matching text (?<field_name>capture pattern) more matching text." For example, a search string 614 includes event text: "131.253.24.135 fail admin_user." Two example regexes that use different syntax in their capturing groups to pull the same set of fields from that event are as follows:

"(?<ip>\d+\.\d+\.\d+\.\d+)(?<result>\w+)(?<user>.*)"; and    Expression A:

"(?<ip>\S+)(?<result>\S+)(?<user>\S+)".    Expression B:

In Expression A, the pattern-matching characters used for the first capture group (ip) are specific. '\d' means "digit" and '+' means "one or more," such that '\d+' means "one or more digits." '\.' refers to a period. The capture group for ip wants to match one or more digits, followed by a period, followed by one or more digits, followed by a period, followed by one or more digits, followed by a period, followed by one or more digits. This can describe the syntax for an Internet Protocol (IP) address. The second capture group in Expression A for the result field has the pattern '\w+', which means "one or more alphanumeric characters." The third capture group in Expression A for the user field has the pattern '.*', which means "match everything that remains."

Expression B uses a technique called negative matching. Instead of using the regex to define which text to match, the regex is stated to define what the text does not match. In Expression B, the values that should be extracted from the sample event are "not space" characters ('\S'). The regex uses the '+' to specify "one or more" of the "not space" characters. As such, Expression B can be interpreted as stating: Pull out the first string of not-space characters for the ip field value; ignore the following space; pull out the second string of not-space characters for the result field value; ignore the second space; and pull out the third string of not-space characters for the user field value.

After processing by the regex engines 644, offloaded processing results (e.g., match flags, etc.) are passed to (e.g., queued or buffered in) the outbound memory 646. From there, the offloaded processing results can be transferred back to the inbound buffers 636 of the offloader 630 over the network interface 640, and then to the post-processor 638. In some implementations, the post-processor 638 can remove any unmatched strings from the search results to generate a set of matched strings 616. For example, the input set of search strings 614 corresponds to a large set of candidate events (e.g., matching a time range, etc.), and the output set of matched strings 616 correspond only to those of the candidate events that match the regex query 612. As described above, implementations of the post-processor 638 can also detect unsuccessful processing results and generate any error flags, or the like. For example, the post-processor 638 can detect that a search string 614 exceeded a maximum string length for matching, that a buffer size was exceeded, etc. In response to such unsuccessful processing conditions, the post-processor 638 can generate any flags, instructions, or the like to direct other components to log the error, to attempt reprocessing using local processing resources (e.g., of the local CPU 610), etc.

The implementation of FIG. 6 can be extended and/or modified to handle different types of operations classified as off-loadable operations 622. For example, as described herein, a search can be defined in a search processing language, and a single search definition can include multiple commands that may interact in various ways. As one example, a search can be defined by the following (the pipe character, '|', is used to connect multiple search commands).

index=myindex country=canada|regex colour="b|\w+"|stats count

Components of the search system 660 (e.g., a search peer in the local CPU 610) can map each of the commands to an operator class and chain the commands together. For example, the above search definition can represent a first command to identify an index of the search peer (e.g., thereby returning a set of search strings 614), a second command to define a regex query 612, and a third command that maps to a statistics processing engine. Each operator can include an "execute" function, or the like, to direct performance of the associated command. For example, the regex command can be performed by the following.

void RegexOperator::execute(SearchResultsFiles &results,SearchResultsInfo& info)

Implementations of the classifier can detect such an execute command and can tag, route, or otherwise direct portions of the execution to be sent to the offloader 630 for offloaded processing. Thus, particular operator classes can be defined in such a way as to be classified as off-loadable operations 622 by the classifier.

In some implementations, operator classes can also be bundled and/or ordered to more fully exploit offloaded processing. As one example, the above description refers to a combined search and regex query operation, which can be a defined operator class that bundles the search and regex query operations. As another example, implementations of the programmed offloading hardware accelerators 674 can be programmed to perform decompression of data. However, it may be inefficient to send data out to programmed offloading hardware accelerators 674 for decompression, receive the decompressed data, and send the decompressed data back out to programmed offloading hardware accelerators 674 for regex processing. To address such a concern, one implementation can include a specification in the search processing language to force regex commands to be placed directly after decompression commands. Other implementations can detect a decompression command as relating to a nearby regex processing command and can automatically bundle the operations together in a manner that efficiently exploits offloaded processing. For example, such automated ordering, routing, bundling, etc. can be performed by implementations of the classifier prior to sending to the offloader 630, or by pre-processor 632 after receipt at the offloader 630.

Figure 7:
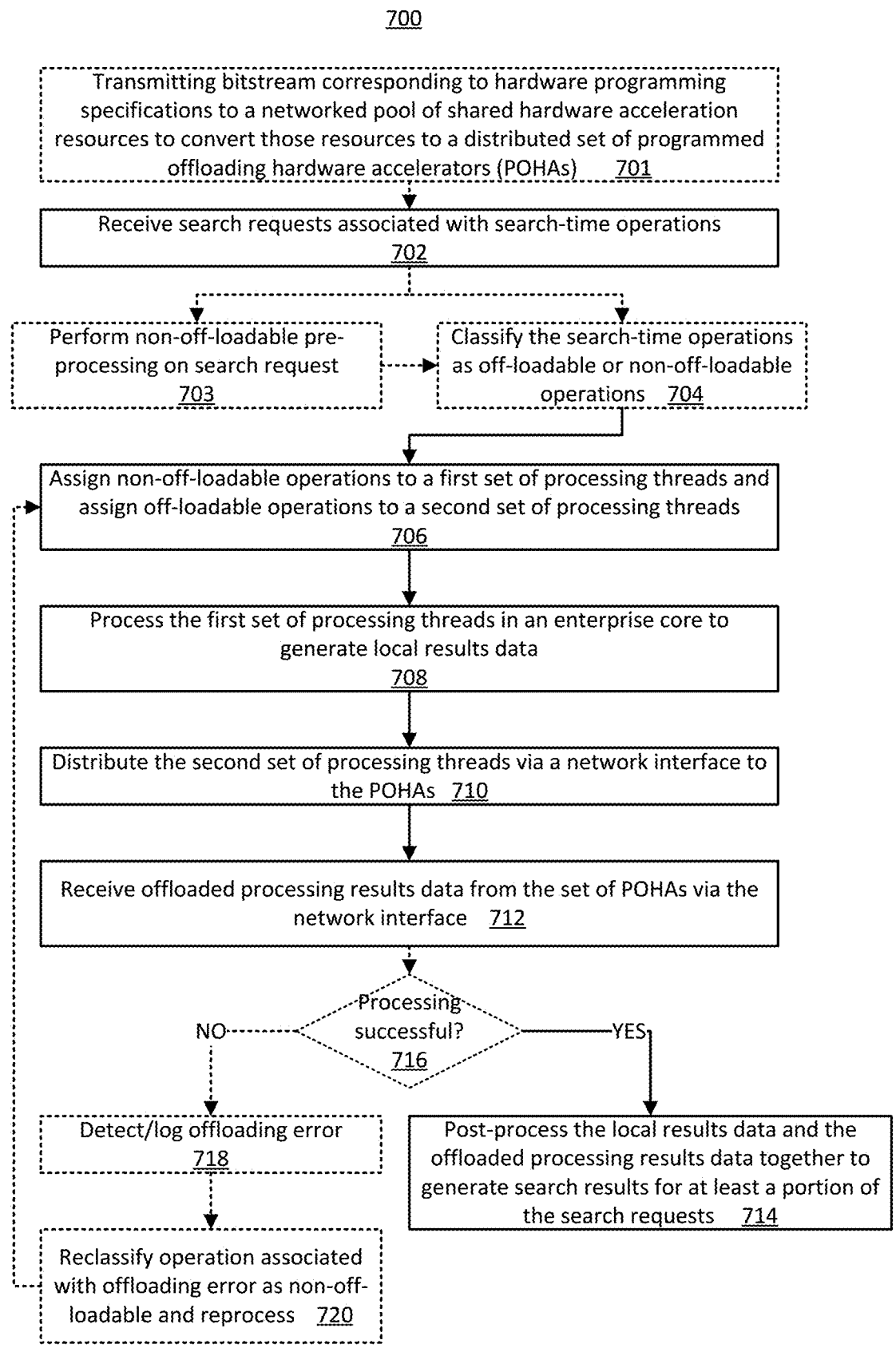
FIG. 7 is a flowchart illustrating an example process for offloaded processing of search-time operations in a search system of an event-based data intake and query system.

FIG. 7 is a flowchart illustrating an example process 700 for offloaded processing of search-time operations in a search system of an event-based data intake and query system. The example process 700 can be implemented by any of the systems described above with reference to FIGS. 1-6. Alternatively or additionally, the example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, cause the one or more processors to perform the operations of the process 700 of FIG. 7.

Implementations of the example process 700 begin at stage 702 by receiving search requests associated with multiple search-time operations for processing the search requests to obtain search results. In some cases, the search requests are for searching an indexed database of events, each corresponding to a discrete portion of previously ingested machine data representing activity of a data source component associable with a timestamp. A first portion of the search-time operations are classified as off-loadable operations, and a second portion of the search-time operations are classified as non-off-loadable operations. At stage 703, some implementations can perform any needed pre-processing operations on the search request. For example, such pre-processing can include parsing the search request, and/or otherwise reformulating the search request, to extract and prepare the various search-time operations for processing. In some implementations, at stage 704, the example process 700 can include classifying each of the search-time operations based on mapping the search-time operation to one of a number of operator classes, each associated with a predetermined classification as either off-loadable or non-off-loadable.

At stage 706, implementations can assign the non-off-loadable operations to a first set of processing threads and can assign the off-loadable operations to a second set of processing threads. In some implementations, the processing threads are parallel processing pipelines. In some implementations, the processing threads are sequenced by components of the event-based data intake and query system, such as by the classifier. For example, a particular search request may be processed by first obtaining compressed event data including strings corresponding to a candidate set of events, then by decompressing the obtained event data, then by parsing a regex query and determining which of the strings matches the regex query, then by post-processing the results to generate a matched set of strings corresponding to a set of events matching the search results, then by generating an output of the results. Each of those operations can be assigned to one or more processing threads and sequenced, as appropriate.

At stage 708, implementations can process the first set of processing threads in an enterprise core to generate local results data. In some implementations, the enterprise core includes local computing resources. In some implementations, the enterprise core alternatively or additionally includes cloud-based computing resources. For example, the first set of processing threads is used to process any search-time operations that are determined not to be offloaded for processing.

At stage 710, implementations can distribute the second set of processing threads via a network interface to a distributed set of programmed offloading hardware accelerators (POHAs). The network interface can include any suitable network interfaces, such as a peripheral component interconnect express (PCIe) interface. Each POHA has logic gates programmed to process one or more of the off-loadable operations. As described herein, each POHA can be implemented as a field-programmable gate array (FPGA) instance that includes on-board memory and one or more process engines. In some implementations, the distributing at stage 710 includes distributing the second set of processing threads to a set of off-loading buffers (e.g., ping-pong buffers) in communication with the set of POHAs via the network interface, and distributing the second set of processing threads to the set of POHAs from the set of off-loading buffers via the network interface.

In some implementations, at stage 701, prior to receiving the search requests in stage 702, the method 700 can transmit a hardware programming specification to each of the set of POHAs via the network interface. The hardware programming specification can be translatable into bitstreams for transmitting to and programming the logic gates of the POHAs to process one or more of the off-loadable operations. In some such implementations, the transmitting includes receiving network identifiers for the set of POHAs, where the set of POHAs being a portion of a networked pool of shared hardware acceleration resources. For example, an offloader, or other suitable component of the event-based data intake and query system, requests access to a certain quantity (e.g., and quality, etc.) of hardware acceleration resources from a provider of such resources as a pooled service, and the provider responds to the request with network identifiers corresponding to particular resources of the pool that can be programmed as POHAs for use by offloaders of the event-based data intake and query system.

At stage 712, implementations can receive offloaded processing results data from the set of POHAs via the network interface. The offloaded processing results data are generated based on processing the off-loadable operations by the set of POHAs. At stage 714, implementations can post-process the local results data and the offloaded processing results data together to generate search results for at least a portion of the search requests. Such post-processing can include multiple stages of post-processing by multiple components. For example, one level of post-processing can be performed by a post-processor of an offloader, and another level or multiple levels of post-processing can be performed by events processing features of a search peer, results processing features of a search head, and/or any other suitable components.

Some implementations of the overall processing pipeline can operate in the following manner according to the example method 700. A search input is received at stage 702. The search result is pre-processed, as needed, at stage 703 to obtain a first set of intermediate results. After any pre-processing, further search-time operations classified as non-off-loadable (e.g., at stage 704) can be assigned to local processing resources at stage 706 and processed locally at stage 708 to obtain local results; and further search-time operations classified as non-off-loadable (e.g., at stage 704) can be assigned to POHA resources at stage 706 and distributed to those resources at stage 710. Assuming remote processing results are successfully received at stage 712, those results and the local results can be post-processed at stage 714 to generate search results.

As one example, at least one of the search requests received in stage 702 is associated with a search-time operation corresponding to regex matching, and regex matching is pre-classified as one of the off-loadable operations. In some implementations of such an example, at least one of the non-off-loadable operations generates the local results data to include a set of search strings corresponding to a candidate set of event data relating to at least one of the search requests. The regex matching can then be used to determine whether each of the set of search strings matches the regex, such that the offloaded processing results data received in stage 712 indicates whether each of at least some of the set of search strings matches the regex. In such an example, the search results generated in stage 714 can include matching strings, all strings tagged with match flags (i.e., that indicate whether the string matched the regex), only match flags configured to be associable with corresponding matched strings, and/or any other suitable indication of matching results. In some cases, the search results generated in stage 714 can be further processed to be a set of events that correspond to the matched set of search strings produced by reducing the local results data based on the offloaded processing results data.

As another example, at least one of the search requests is associated with a data file of compressed data, and decompression of compressed data is pre-classified as one of the off-loadable operations. As another example, at least one of the search requests is associated with a search-time operation corresponding to regex matching to a data file of compressed data, and decompression and regex matching are both pre-classified as off-loadable operations. In such an example, the assigning in stage 706 can include bundling the decompression and regex matching for assignment to the second set of processing threads. The distributing in stage 710 can then be performed, such that the decompression is performed by the POHAs on the compressed data to generate decompressed data, and the regex matching is subsequently performed by the POHAs on the decompressed data to generate regex matching results without sending the decompressed data back over the network interface. As another example, at least one of the search requests is associated with a data file having IP addresses, and automated extraction and indexing of IP addresses is pre-classified as one of the off-loadable operations. As another example, the search requests identify a log file, at least one of the POHAs is programmed with a machine learning engine pre-trained to autonomously extract fields from data files, at least one of the assigned off-loadable operations includes autonomously extracting fields from the log file, and the distributing at stage 710 includes distributing the at least one of the assigned off-loadable operations to the at least one of the set of POHAs.

In some implementations, a determination is made at stage 716 as to whether the offloaded processing was successful. For example, the offloaded processing results data received at stage 712 can indicate whether there is a relevant processing result, or whether there is an error, or other indication of processing failure. In such implementations, if the determination at stage 716 is that the offloaded processing was successful the method 700 can proceed to stage 714. Otherwise, at stage 718, implementations can that an offloading error has occurred, indicating a failure by the set of POHAs to process an associated one of the off-loadable operations. The error condition can be logged, reported, etc. In some implementations, at stage 720, the off-loadable operation or operations associated with the detected error condition can be reclassified as a non-off-loadable operation or operations for processing in the enterprise core to generate an associated portion of the local results data. For example, the method 700 can return to stage 706 to assign the reclassified non-off-loadable operation or operations to appropriate processing threads.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving a plurality of search requests associated with a plurality of search-time operations for processing the plurality of search requests to obtain search results, a first portion of the search-time operations being classified as off-loadable operations and a second portion of the search-time operations being classified as non-off-loadable operations;

assigning the non-off-loadable operations to a first set of processing threads, and assigning the off-loadable operations to a second set of processing threads;

processing the first set of processing threads in an enterprise core to generate local results data;

distributing the second set of processing threads via a network interface to a distributed set of programmed offloading hardware accelerators (POHAs);

receiving offloaded processing results data from the set of POHAs via the network interface, the offloaded processing results data generated based on processing the off-loadable operations by the set of POHAs; and post-processing the local results data and the offloaded processing results data together to generate search results for at least a portion of the search requests.

2. The computer-implemented method of claim 1, wherein each of the POHAs comprises a field-programmable gate array (FPGA) instance having memory and logic gates integrated thereon, the logic gates configured to be remotely programmed over the network interface to provide hardware acceleration of one or more of the off-loadable operations.

3. The computer-implemented method of claim 1, further comprising:
    detecting an offloading error responsive to the receiving the offloaded processing results data, the offloading error indicating a failure by the set of POHAs to process an associated one of the off-loadable operations; and
    reclassifying the associated one of the off-loadable operations as a non-off-loadable operation for processing in the enterprise core to generate an associated portion of the local results data.

4. The computer-implemented method of claim 1, further comprising:
    classifying each of the plurality of search-time operations by the enterprise core based on mapping each search-time operation to one of a plurality of operator classes, each associated with a predetermined classification as either off-loadable or non-off-loadable.

5. The computer-implemented method of claim 1, further comprising:
    performing pre-processing on the search results locally in the enterprise core prior to the assigning.

6. The computer-implemented method of claim 1, wherein the plurality of search requests are for searching an indexed database of events, each corresponding to a discrete portion of previously ingested machine data representing activity of a data source component associable with a timestamp.

7. The computer-implemented method of claim 1, wherein:
    at least one of the plurality of search requests is associated with a search-time operation corresponding to matching of a regular expression (regex); and
    regex matching is pre-classified as one of the off-loadable operations.

8. The computer-implemented method of claim 1, wherein:
    at least one of the plurality of search requests is associated with a search-time operation corresponding to matching of a regular expression (regex);
    at least one of the non-off-loadable operations generates the local results data to include a set of search strings corresponding to a candidate set of event data relating to at least one of the plurality of search requests; and
    the regex matching is to determine whether each of the set of search strings matches the regex, such that the offloaded processing results data indicates whether each of at least some of the set of search strings matches the regex.

9. The computer-implemented method of claim 8, wherein the post-processing comprises generating the search results based on a matched set of search strings produced by reducing the local results data based on the offloaded processing results data.

10. The computer-implemented method of claim 1, wherein:
    at least one of the plurality of search requests is associated with a data file of compressed data; and
    decompression of compressed data is pre-classified as one of the off-loadable operations.

11. The computer-implemented method of claim 1, wherein:
    at least one of the plurality of search requests is associated with a search-time operation corresponding to matching of a regular expression (regex) to a data file of compressed data;
    decompression and regex matching are both pre-classified as off-loadable operations;
    the assigning comprises bundling the decompression and regex matching for assignment to the second set of processing threads; and
    the distributing the second set of processing threads is such that the decompression is performed by the POHAs on the compressed data to generate decompressed data and the regex matching is subsequently performed by the POHAs on the decompressed data to generate regex matching results without sending the decompressed data back over the network interface.

12. The computer-implemented method of claim 1, wherein:
    at least one of the plurality of search requests is associated with a data file having a plurality of Internet Protocol (IP) addresses; and
    automated extraction and indexing of Internet Protocol (IP) addresses is pre-classified as one of the off-loadable operations.

13. The computer-implemented method of claim 1, wherein:
    the plurality of search requests identifies a log file;
    at least one of the set of POHAs is programmed with a machine learning engine pre-trained to autonomously extract fields from data files;
    at least one of the assigned off-loadable operations comprises autonomously extracting fields from the log file; and
    the distributing comprises distributing the at least one of the assigned off-loadable operations to the at least one of the set of POHAs.

14. The computer-implemented method of claim 1, wherein the distributing comprises:
    distributing the second set of processing threads to a set of off-loading buffers in communication with the set of POHAs via the network interface; and
    distributing the second set of processing threads to the set of POHAs from the set of off-loading buffers via the network interface.

15. The computer-implemented method of claim 14, wherein the set of off-loading buffers is a set of ping-pong buffers, such that: in a first timeframe, a second portion of the second set of processing threads is being distributed to a second of the set of ping-pong buffers while a first portion of the second set of processing threads is being distributed from a first of the set of ping-pong buffers to the set of POHAs; and in a second timeframe, a third portion of the second set of processing threads is being distributed to the first of the set of ping-pong buffers while the second portion of the second set of processing threads is being distributed from the second of the set of ping-pong buffers to the set of POHAs.

16. The computer-implemented method of claim 1, further comprising, prior to the receiving the plurality of search requests:
receiving network identifiers for the set of POHAs, the set of POHAs being a portion of a networked pool of shared hardware acceleration resources; and
transmitting, to each of the set of POHAs via the network interface, a bitstream corresponding to the hardware programming specification for programming logic gates of the POHAs to process one or more of the off-loadable operations.

17. The computer-implemented method of claim 1, wherein:
the receiving the plurality of search requests, the assigning, the distributing, the receiving the offloaded processing results data, and the post-processing are all performed by the enterprise core.

18. A computing device for implementation in an enterprise core, comprising:
a network interface to communicate with a distributed set of programmed offloading hardware accelerators (POHAs) via one or more remote networks;
a processor; and
a non-transitory computer-readable medium having stored thereon instructions that, when executed by the processor, cause the processor to perform operations comprising:
receiving a plurality of search requests associated with a plurality of search-time operations for processing the plurality of search requests to obtain search results, a first portion of the search-time operations being classified as off-loadable operations and a second portion of the search-time operations being classified as non-off-loadable operations;
assigning the non-off-loadable operations to a first set of processing threads, and assigning the off-loadable operations to a second set of processing threads;
processing the first set of processing threads in the enterprise core to generate local results data;
distributing the second set of processing threads via the network interface to the distributed set of POHAs;
receiving offloaded processing results data from the set of POHAs via the network interface, the offloaded processing results data generated based on processing the off-loadable operations by the set of POHAs; and
post-processing the local results data and the offloaded processing results data together to generate search results for at least a portion of the search requests.

19. The computing device of claim 18, wherein each of the POHAs comprises a field-programmable gate array (FPGA) instance having memory and logic gates integrated thereon, the logic gates configured to be remotely programmed over the network interface to provide hardware acceleration of one or more of the off-loadable operations.

20. The computing device of claim 18, wherein the instructions, when executed by the processor, cause the processor to perform the operations further comprising:
detecting an offloading error responsive to the receiving the offloaded processing results data, the offloading error indicating a failure by the set of POHAs to process an associated one of the off-loadable operations; and
reclassifying the associated one of the off-loadable operations as a non-off-loadable operation for processing in the enterprise core to generate an associated portion of the local results data.

21. The computing device of claim 18, wherein the instructions, when executed by the processor, cause the processor to perform the operations further comprising:
classifying each of the plurality of search-time operations by the enterprise core based on mapping each search-time operation to one of a plurality of operator classes, each associated with a predetermined classification as either off-loadable or non-off-loadable.

22. The computing device of claim 18, wherein the instructions, when executed by the processor, cause the processor to perform the operations further comprising:
performing pre-processing on the search results locally in the enterprise core prior to the assigning.

23. The computing device of claim 18, wherein the plurality of search requests are for searching an indexed database of events, each corresponding to a discrete portion of previously ingested machine data representing activity of a data source component associable with a timestamp.

24. The computing device of claim 18, wherein:
at least one of the plurality of search requests is associated with a search-time operation corresponding to matching of a regular expression (regex); and
regex matching is pre-classified as one of the off-loadable operations.

25. The computing device of claim 18, wherein:
at least one of the plurality of search requests is associated with a search-time operation corresponding to matching of a regular expression (regex);
at least one of the non-off-loadable operations generates the local results data to include a set of search strings corresponding to a candidate set of event data relating to at least one of the plurality of search requests; and
the regex matching is to determine whether each of the set of search strings matches the regex, such that the offloaded processing results data indicates whether each of at least some of the set of search strings matches the regex.

26. The computing device of claim 25, wherein the post-processing comprises generating the search results based on a matched set of search strings produced by reducing the local results data based on the offloaded processing results data.

27. The computing device of claim 18, wherein:
at least one of the plurality of search requests is associated with a data file of compressed data; and
decompression of compressed data is pre-classified as one of the off-loadable operations.

28. The computing device of claim 18, wherein:
at least one of the plurality of search requests is associated with a search-time operation corresponding to matching of a regular expression (regex) to a data file of compressed data;
decompression and regex matching are both pre-classified as off-loadable operations;
the assigning comprises bundling the decompression and regex matching for assignment to the second set of processing threads; and the distributing the second set of processing threads is such that the decompression is performed by the POHAs on the compressed data to generate decompressed data and the regex matching is subsequently performed by the POHAs on the decompressed data to generate regex matching results without sending the decompressed data back over the network interface.

29. The computing device of claim 18, wherein:
at least one of the plurality of search requests is associated with a data file having a plurality of Internet Protocol (IP) addresses; and
automated extraction and indexing of Internet Protocol (IP) addresses is pre-classified as one of the off-loadable operations.

30. The computing device of claim 18, wherein:
the plurality of search requests identifies a log file;
at least one of the set of POHAs is programmed with a machine learning engine pre-trained to autonomously extract fields from data files;
at least one of the assigned off-loadable operations comprises autonomously extracting fields from the log file; and
the distributing comprises distributing the at least one of the assigned off-loadable operations to the at least one of the set of POHAs.

31. The computing device of claim 18, further comprising:
a set of off-loading buffers in communication with the set of POHAs via the network interface,
wherein the distributing the second set of processing threads comprises distributing the second set of processing threads to the set of off-loading buffers and subsequently from the set of off-loading buffers to the set of POHAs via the network interface.

32. The computing device of claim 31, wherein the set of off-loading buffers is a set of ping-pong buffers, such that: in a first timeframe, a second portion of the second set of processing threads is being distributed to a second of the set of ping-pong buffers while a first portion of the second set of processing threads is being distributed from a first of the set of ping-pong buffers to the set of POHAs; and in a second timeframe, a third portion of the second set of processing threads is being distributed to the first of the set of ping-pong buffers while the second portion of the second set of processing threads is being distributed from the second of the set of ping-pong buffers to the set of POHAs.

33. The computing device of claim 18, wherein the instructions, when executed by the processor, cause the processor to perform the operations further comprising, prior to the receiving the plurality of search requests:
receiving network identifiers for the set of POHAs, the set of POHAs being a portion of a networked pool of shared hardware acceleration resources; and
transmitting, to each of the set of POHAs via the network interface, a bitstream corresponding to the hardware programming specification for programming logic gates of the POHAs to process one or more of the off-loadable operations.

34. The computing device of claim 18, wherein the network interface is a peripheral component interconnect express (PCIe) interface.

35. The computing device of claim 18, wherein the enterprise core is implemented by a local central processing unit.

36. A non-transitory computer-readable medium having stored thereon instructions that, when executed by one or more processors, cause the one or more processors to perform operations comprising:
receiving a plurality of search requests associated with a plurality of search-time operations for processing the plurality of search requests to obtain search results, a first portion of the search-time operations being classified as off-loadable operations and a second portion of the search-time operations being classified as non-off-loadable operations;
assigning the non-off-loadable operations to a first set of processing threads, and assigning the off-loadable operations to a second set of processing threads;
processing the first set of processing threads in a enterprise core to generate local results data;
distributing the second set of processing threads via a network interface to the distributed set of POHAs;
receiving offloaded processing results data from the set of POHAs via the network interface, the offloaded processing results data generated based on processing the off-loadable operations by the set of POHAs; and
post-processing the local results data and the offloaded processing results data together to generate search results for at least a portion of the search requests.

37. The non-transitory computer-readable medium of claim 36, wherein each of the POHAs comprises a field-programmable gate array (FPGA) instance having memory and logic gates integrated thereon, the logic gates configured to be remotely programmed over the network interface to provide hardware acceleration of one or more of the off-loadable operations.

38. The non-transitory computer-readable medium of claim 36, wherein the instructions, when executed by the one or more processors, cause the one or more processors to perform the operations further comprising:
detecting an offloading error responsive to the receiving the offloaded processing results data, the offloading error indicating a failure by the set of POHAs to process an associated one of the off-loadable operations; and
reclassifying the associated one of the off-loadable operations as a non-off-loadable operation for processing in the enterprise core to generate an associated portion of the local results data.

39. The non-transitory computer-readable medium of claim 36, wherein the instructions, when executed by the one or more processors, cause the one or more processors to perform the operations further comprising:
classifying each of the plurality of search-time operations by the enterprise core based on mapping each search-time operation to one of a plurality of operator classes, each associated with a predetermined classification as either off-loadable or non-off-loadable.

40. The non-transitory computer-readable medium of claim 36, wherein the instructions, when executed by the one or more processors, cause the one or more processors to perform the operations further comprising:
performing pre-processing on the search results locally in the enterprise core prior to the assigning.

41. The non-transitory computer-readable medium of claim 36, wherein the plurality of search requests are for searching an indexed database of events, each corresponding to a discrete portion of previously ingested machine data representing activity of a data source component associable with a timestamp.

42. The non-transitory computer-readable medium of claim 36, wherein:

at least one of the plurality of search requests is associated with a search-time operation corresponding to matching of a regular expression (regex); and regex matching is pre-classified as one of the off-loadable operations.

43. The non-transitory computer-readable medium of claim 36, wherein:
at least one of the plurality of search requests is associated with a search-time operation corresponding to matching of a regular expression (regex);
at least one of the non-off-loadable operations generates the local results data to include a set of search strings corresponding to a candidate set of event data relating to at least one of the plurality of search requests; and
the regex matching is to determine whether each of the set of search strings matches the regex, such that the offloaded processing results data indicates whether each of at least some of the set of search strings matches the regex.

44. The non-transitory computer-readable medium of claim 43, wherein the post-processing comprises generating the search results based on a matched set of search strings produced by reducing the local results data based on the offloaded processing results data.

45. The non-transitory computer-readable medium of claim 36, wherein:
at least one of the plurality of search requests is associated with a data file of compressed data; and
decompression of compressed data is pre-classified as one of the off-loadable operations.

46. The non-transitory computer-readable medium of claim 36, wherein:
at least one of the plurality of search requests is associated with a search-time operation corresponding to matching of a regular expression (regex) to a data file of compressed data;
decompression and regex matching are both pre-classified as off-loadable operations;
the assigning comprises bundling the decompression and regex matching for assignment to the second set of processing threads; and the distributing the second set of processing threads is such that the decompression is performed by the POHAs on the compressed data to generate decompressed data and the regex matching is subsequently performed by the POHAs on the decompressed data to generate regex matching results without sending the decompressed data back over the network interface.

47. The non-transitory computer-readable medium of claim 36, wherein:
at least one of the plurality of search requests is associated with a data file having a plurality of Internet Protocol (IP) addresses; and
automated extraction and indexing of Internet Protocol (IP) addresses is pre-classified as one of the off-loadable operations.

48. The non-transitory computer-readable medium of claim 36, wherein:
the plurality of search requests identifies a log file;
at least one of the set of POHAs is programmed with a machine learning engine pre-trained to autonomously extract fields from data files;
at least one of the assigned off-loadable operations comprises autonomously extracting fields from the log file; and
the distributing comprises distributing the at least one of the assigned off-loadable operations to the at least one of the set of POHAs.

49. The non-transitory computer-readable medium of claim 36, wherein the instructions, when executed by the one or more processors, cause the one or more processors to perform the operations further comprising, prior to the receiving the plurality of search requests:
receiving network identifiers for the set of POHAs, the set of POHAs being a portion of a networked pool of shared hardware acceleration resources; and
transmitting, to each of the set of POHAs via the network interface, a bitstream corresponding to the hardware programming specification for programming logic gates of the POHAs to process one or more of the off-loadable operations.

* * * * *